United States Patent [19]
Porter et al.

[11] 4,286,904
[45] Sep. 1, 1981

[54] WOOD BIT

[75] Inventors: L. Steven Porter, Shrewsbury; Raymond A. Stockley, Dudley, both of Mass.

[73] Assignee: Parker Manufacturing Company, Worcester, Mass.

[21] Appl. No.: 57,662

[22] Filed: Jul. 16, 1979

[51] Int. Cl.³ ........................ B23B 51/00; B27G 15/00
[52] U.S. Cl. ................................ 408/225; 145/116 R; 408/228
[58] Field of Search ............... 408/211, 223, 226, 225, 408/228, 144; 145/116 R

[56] References Cited

U.S. PATENT DOCUMENTS

| | | | |
|---|---|---|---|
| 2,689,131 | 9/1954 | Priest | 408/144 X |
| 2,782,824 | 2/1957 | Robinson | 145/116 R |
| 3,199,381 | 8/1965 | Mackey | 408/144 |
| 3,477,481 | 11/1969 | Czerniewicz | 145/116 R |
| 3,543,820 | 12/1970 | Tulumellu | 145/116 X |
| 3,920,350 | 11/1975 | Southall | 408/225 X |
| 3,920,350 | 6/1957 | Huxtable | 408/211 |
| 3,997,279 | 12/1976 | Porter et al. | 408/211 |

*Primary Examiner*—William R. Briggs
*Attorney, Agent, or Firm*—Thompson, Birch, Gauthier & Samuels

[57] ABSTRACT

Bit for drilling wood or the like consisting of a spade from which extends a centrally-located point, the point being provided with a groove defined by two plane surfaces extending at an obtuse angle.

5 Claims, 8 Drawing Figures

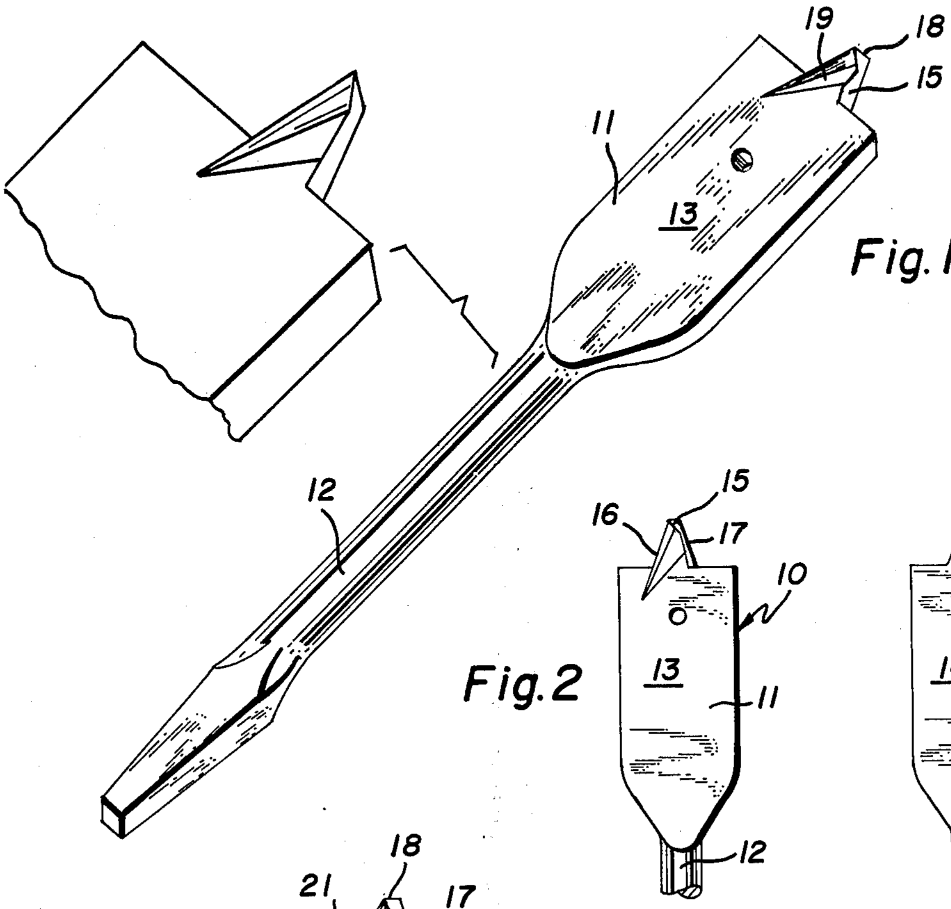
Fig. 1
Fig. 2
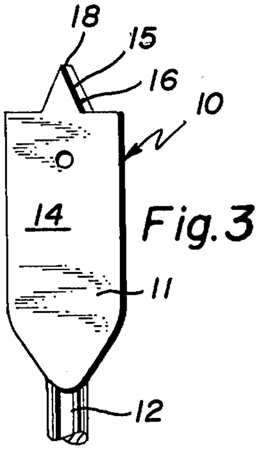
Fig. 3
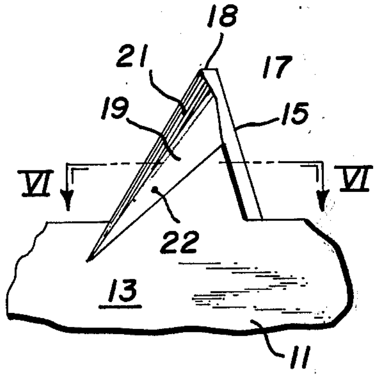
Fig. 5
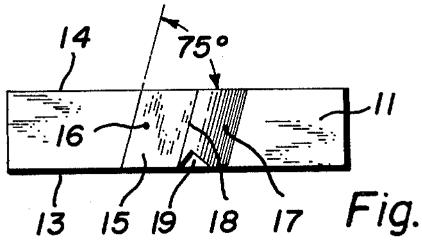
Fig. 4
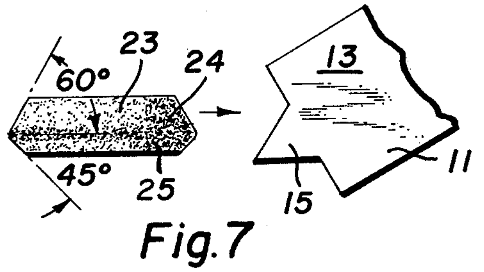
Fig. 7
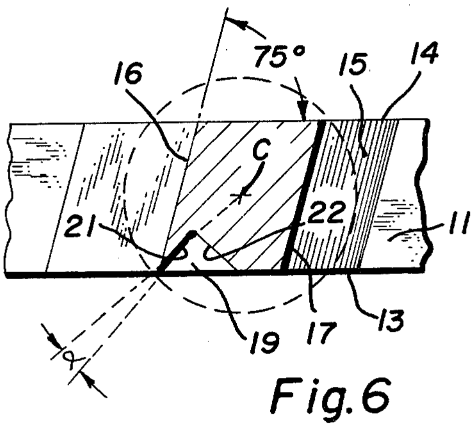
Fig. 6
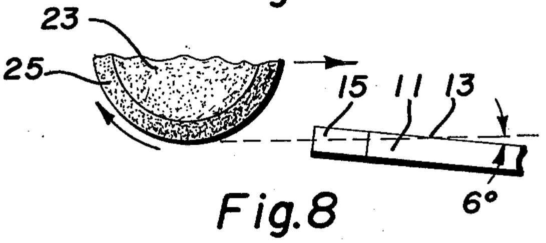
Fig. 8

WOOD BIT

BACKGROUND OF THE INVENTION

Since conventional wood bits are so expensive to manufacture and so difficult to maintain and keep sharp, it has become customary in many cases to use a spade-type bit for drilling holes in wood or the like. Generally speaking, the spade-type bit has the advantage that it is simple and inexpensive, as well as easy to sharpen. In the simplest type the leading edge of the spade and the edges of the central point that extends from it are ground with a relief to give a cutting edge. In order to improve the speed of cutting, it has been suggested that the point be provided with grooves. For instance, in the patent of Robinson U.S. Pat. No. 2,782,824, grooves were formed along the cutting edges of the point. In the patent of Porter U.S. Pat. No. 3,997,279, grooves are formed as concave cylindrical surfaces which were symmetrical of the center line of the point. While these designs give excellent cutting, they are also considerably more expensive than the ungrooved spade-type bit. These and other difficulties experienced with the prior art devices have been obviated in a novel manner by the present invention.

It is, therefore, an outstanding object of the invention to provide a wood bit which, while relatively inexpensive, is capable of efficient cutting operation.

Another object of this invention is the provision of a wood bit which can be readily sharpened by an inexperienced person and without the use of extraordinary tools.

A further object of the present invention is the method of inexpensively making a spade-type wood bit.

It is another object of the instant invention to provide a wood bit which is simple in construction, which is inexpensive to manufacture, and which is capable of a long life of useful service with a minimum of maintenance.

SUMMARY OF THE INVENTION

In general, the invention consists of a bit having a generally rectangular spade from one end of which extends a spindle, the spade being defined by two broad parallel surfaces. A point extends from the other end of the spade, the point being defined by two edge plane surfaces lying at a substantial angle to the broad surfaces of the spade and intersecting along a line which also extends at a substantial angle to the surfaces. A the groove is formed in the point, groove being formed by two plane surfaces lying at an obtuse angle to one another, one of the planes extending through one edge of the point to give a positive rake angle.

Most specifically, the two plane surfaces are generated by a grinding wheel having two opposed frusto-conical surfaces, the wheel being passed over the point at an acute angle to the axis of rotation of the spindle. The groove therefore, has an increasing depth from the root of the point to the pointed extremity.

BRIEF DESCRIPTION OF THE DRAWINGS

FIG. 1 is a perspective view of a bit embodying the principles of the present inventions, FIG. 2 is a front elevational view of the bit, FIG. 3 is a rear elevational view of the bit, FIG. 4 is a enlarged plan view of the bit, FIG. 5 is an enlarged perspective view of a portion of the bit, FIG. 6 is a enlarged end view of the bit, and FIGS. 7 and 8 are elevational and plan views, respectively, of a method for producing the bit.

DESCRIPTION OF THE PREFERRED EMBODIMENT

Referring first to FIGS. 1, 2, and 3, which best show the general features of the invention, the bit, indicated generally by the reference numeral 10, is shown as having a generally rectangular spade 11 which has a spindle 12 extending from one end. The spade is provided with two broad plane surfaces 13 and 14 which lie in spaced parallel relationship.

A point 15 extends from the end of the space opposite the end to which the spindle 12 is attached. The point is defined by the two broad surfaces 13 and 14 and by two plane edge surfaces 16 and 17, each of which lies at a substantial angle to the broad surfaces. The surfaces 16 and 17 intersect at a forward edge or line 18 which, of course, extends at the same angle to the broad surfaces as the surfaces 16 and 17. A groove 19 is formed in the point 15 and is defined by two plane surfaces 21 and 22 which lie at an obtuse angle to one another.

FIGS. 4, 5 and 6 show the details of the invention. The surfaces 21 passes through the line of intersection of the broad surface 13 of the spade and point and the edge surface 16 to give a positive rake angle therewith, as is most evident in FIG. 6 where the positive rake angle $\alpha$ is indicated by the angle.

In the preferred embodiment, a single groove 19 enters the one broad surface of the point but no groove is provided on the other surface. The root of the groove 19 (the intersection of the planes 21 and 22) is provided with a slight fillet. Also, in the preferred embodiment the surface 16 lies at an angle of 75° to the braod surface 13, and, therefore, has a relief angle of 15°, indicated at b in FIG. 6 while the surface 17 similarly lies at an angle of 75° to the broad surface 14 and has a relief of 15°. The groove increases in depth from its beginning (adjacent the junction of the root of the point to the main body of the spade) to its termination (adjacent the line 18 where it opens onto the surface 17). Most specifically, the line of intersection of the planes 21 and 22 lies at an angle of 6° to the broad surface 13.

FIGS. 7 and 8 illustrate the manner in which the groove 19 is formed. The groove is generated by the use of a grinding wheel 23, having opposed frusto-conical surfaces 24 and 25. The grinding wheel is rotated about its axis and is passed over the unfinished bit with the plane of the junction between the surfaces 24 and 25 located somewhat inwardly of the cutting edge defined by the surface 16 and the surface 13. The grinding wheel makes this passage at an angle of 6° to the plane of the surface 13 and this produces the groove. In the preferred embodiment, the junction between the surfaces 24 and 25, instead of being a sharp edge, it is slightly rounded to provide the fillet at the bottom of the groove.

The operation and the advantages of the present invention will now be readily understood in view of the above description. As is usual with such bits, the bit is rotated in a tool by use of the spindle 12, and is rotated about the axis of that spindle. This axis extends midway along the line 18 at the end of the point 15 and is indicated as C in FIG. 6. This means that, as the point enters the stock, the cutting edge appears as the intersection of the surface 16 of the point with the broad surface 13 (on the one hand) and the edge formed by the surface 17 and its intersection with the surface 14 (on the other hand). Because of the positive rake angle $\alpha$ that lies between the surface 21 of the groove (on the one hand) and the line joining the center C to the cutting edge at the intersection of surface 16 and the surface 13 (on the other hand) excellent cutting takes place. It is not necessary to provide a brad (pyramidal point) on the end of the point 15, for instance. Tests were carried out to compare the effectiveness of a wood bit constructed in accordance with the present invention with a conventional wood bit provided with a brad at the end of the point, but with no groove and also to compare it with a bit constructed in accordance with the above-mentioned Robinson patent. In the test, the depth of cut in a fifteen-second period under standard conditions were used as a basis for comparison. The standard conditions involved the boring or drilling of dry, hard maple lumber in a drill press at 940 R.P.M. with a 30-pound feed load. The results were as follows:

TEST RESULTS

| BIT SIZE | A CONVENTIONAL BRAD POINT | B ROBINSON | C INVENTION |
|---|---|---|---|
| ½" | 0.570 Inches | 1.668 Inches | 2.140 Inches |
| ⅝" | 0.500 | 1.575 | 2.352 |
| ¾" | 0.530 | 1.400 | 1.879 |
| 1.0" | 0.365 | 1.106 | 1.575 |
| 1⅛" | 0.318 | 0.985 | 1.640 |
| 1⅜" | 0.505 | 0.595 | 0.940 |
| 1½" | 0.540 | 0.563 | 0.988 |

It can be seen, then, that the bit constructed in accordance with the present invention shows an improvement over the Robinson type which averages about 52%. The average increase over a conventional brad-pointed bit was 429%. It can be seen that, by use of relatively simple manufacturing process, it is possible to produce a very effective cutting bit in a relatively inexpensive manner. As a matter of fact, the conventional brad or pointed end to the large point can be omitted.

We claim:

1. A spade-type bit comprising:

(a) a body defined by two parallel broad surfaces and two narrow side surfaces extending between said two broad surfaces, (b) a spindle extending from a rearward end of said body, (c) a point extending from a forward end of said body, said point being defined by said two broad surfaces and by two second side surfaces, said second side surfaces converging forwardly and intersecting to form a forward edge, and (d) a groove formed in one of said broad surfaces along said point and extending generally parallel to one of said second side surfaces and intersecting the other one of said second side surfaces, an edge of said one second side surface adjacent said groove being maintained, said groove forming a positive rake angle, said groove gradually increasing substantially uniformly in depth and width toward said other one of said side second surfaces.

2. The spade-type bit as recited in claim 1, wherein said groove is defined by two plane surfaces which lie at an obtuse angle to one another, said plane surfaces of the groove intersecting with said other one of said side surfaces.

3. The spade-type bit as recited in claim 2 wherein said two plane surfaces of said groove are joined by a round concave fillet.

4. The spade-type bit as recited in claim 1 wherein the slope of said groove is approximately 6° with respect to said one broad surface.

5. The spade-type bit as recited in claim 1 wherein each of said side surfaces of said point has a relief angle of 15°.

* * * * *

UNITED STATES PATENT AND TRADEMARK OFFICE
CERTIFICATE OF CORRECTION

PATENT NO. : 4,286,904

DATED : September 1, 1981

INVENTOR(S) : L. Steven Porter and Raymond A. Stockley

It is certified that error appears in the above-identified patent and that said Letters Patent are hereby corrected as shown below:

Claim 1, line 24, delete "side second" and insert -- second side --.

Signed and Sealed this

*Twenty-fourth* Day of *November 1981*

[SEAL]

*Attest:*

GERALD J. MOSSINGHOFF

*Attesting Officer* *Commissioner of Patents and Trademarks*